Patented June 5, 1923.

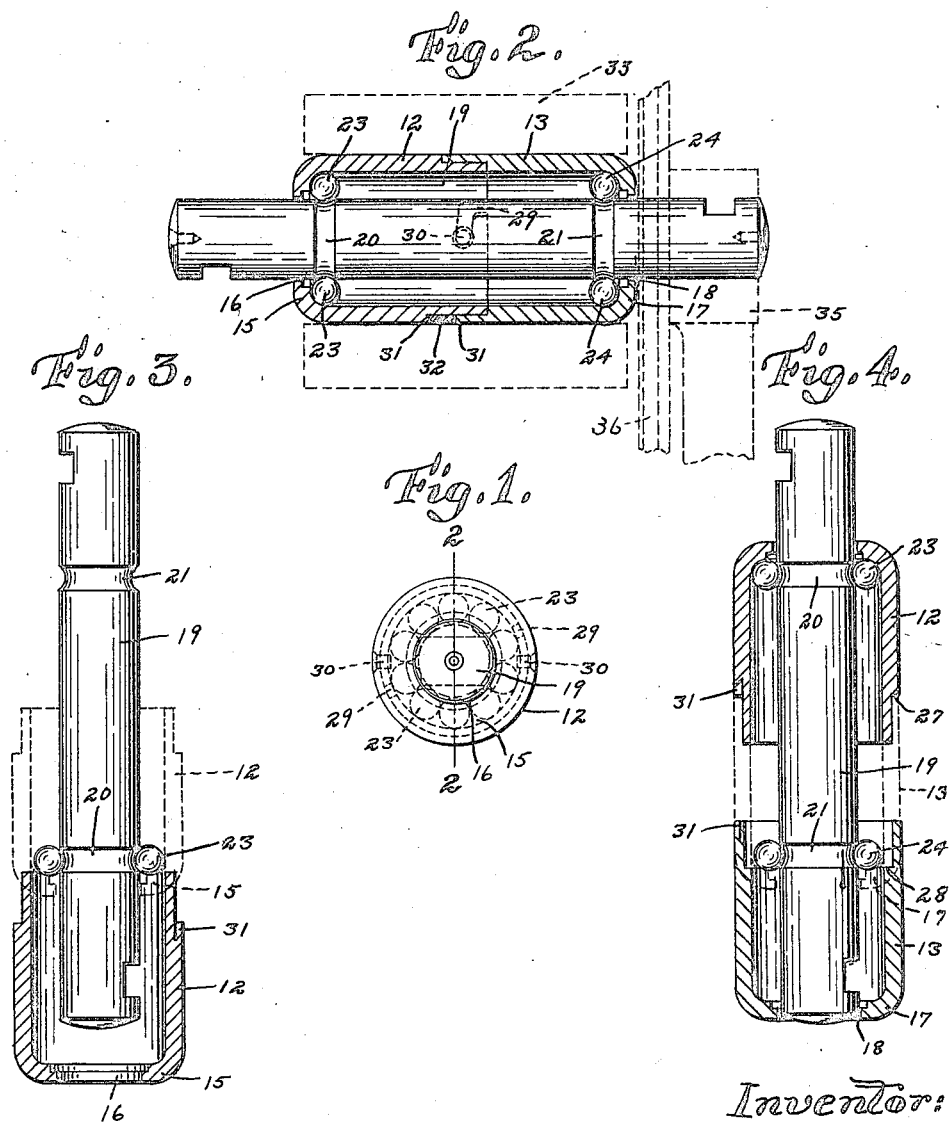

1,457,954

UNITED STATES PATENT OFFICE.

HUGH W. BATCHELLER, OF WORCESTER, MASSACHUSETTS, ASSIGNOR OF ONE-HALF TO H. F. FARRELL, OF WORCESTER, MASSACHUSETTS.

ANTIFRICTION BEARING FOR BICYCLE CRANK SHAFTS, ETC.

Application filed June 13, 1922. Serial No. 568,000.

*To all whom it may concern:*

Be it known that I, HUGH W. BATCHELLER, a citizen of Canada, residing at Worcester, in the county of Worcester and State of Massachusetts, have invented new and useful Improvements in Antifriction Bearings for Bicycle Crank Shafts, Etc., of which the following is a specification.

This invention is embodied in a simple, durable, compact and easily assembled antifriction bearing, the parts of which are securely maintained in a predetermined assembled relation, the bearing comprising an internally cylindrical case, a shaft coaxial with the case, and balls spacing the case from the shaft. The novel features characterizing the invention are such that the case may be adapted for engagement as a crankshaft hanger with a fixed socket in a bicycle frame, the shaft being formed at its end portions for engagement with the usual cranks and with a sprocket wheel. The invention may, however, be embodied in a bearing for other purposes.

Of the accompanying drawings forming a part of this specification,—

Figure 1 is an end elevation of a bearing embodying the invention.

Figure 2 is a section on line 2—2 of Figure 1, the shaft and balls being shown in elevation.

Figures 3 and 4 are views partly in section, and partly in elevation, illustrating the successive operations whereby the parts are assembled and interlocked, as shown by Figure 2.

The same reference characters indicate the same parts in all of the figures.

My improved bearing comprises an internally cylindrical case, composed of two originally independent sections 12 and 13. Said sections have meeting end portions, formed to be interengaged so that the sections collectively constitute a continuous case, said portions and the preferred means for interlocking the same being hereinafter described.

The section 12 is provided at its outer end with an inwardly projecting annular flange 15, forming a ball race element, and bounding a circular opening 16. The section 13 is provided at its outer end with a similar flange 17, bounding an opening 18.

19 represents a cylindrical shaft extending through the case and through said openings, and provided with peripheral ball-engaging grooves 20 and 21, spaced to conform to the flanges 15 and 17, the said grooves and flanges being relatively arranged, so that balls running in said grooves contact at the same time with said flanges.

Located to run in the groove 20, and contact with the flange 15, are balls 23, preferably of hardened steel. Located to run in the groove 21, and contact with the flange 17, are similar balls 24. The diameter of the balls is such that they bear simultaneously on the surfaces of said grooves, and on the cylindrical inner surface of the case. The arrangement is such that the balls are confined by the case in engagement with the grooves, and confine the shaft and the case against relative endwise movement, so that when the parts are assembled, as shown by Figure 2, the shaft is not displaceable endwise.

The described parts may be assembled by successive operations, as follows: The shaft 19 being held in an upright position, with the groove 20 lowermost, as shown by Figure 3, the shaft is partly inserted in the section 12, until the lower edge of the groove is about flush with the upper end of the section. The balls 23 are then deposited and supported by the open end of the section in engagement with the groove. The section 12 is then raised until its flange 15 contacts with the balls 23, as shown by dotted lines, so that the section 12, the balls and the shaft are interlocked. The shaft is next inverted, as shown by Figure 4, and its lower end is partly inserted in the section 13, until the lower edge of the groove 21 is about flush with an internal shoulder 28, hereinafter described, in said section. The balls 24 are then deposited and supported by said shoulder in engagement with the groove. Finally the section 13 is raised until its flange 17 contacts with the balls, as shown by dotted lines, so that the section 13, the balls 24, and the shaft are interlocked, this movement of the section 13 causing the open ends of the two sections to meet together and form a continuous case.

The open or meeting end portion of one section is preferably externally reduced to form an external shoulder 27. The corresponding end portion of the other section is internally enlarged to form the internal shoulder 28 above mentioned. One of said end portions is thus adapted to slide into the other, the sliding movement being limited by the shoulders 27 and 28.

To prevent the separation of the connected end portions, I provide fastening means, preferably embodied in a bayonet joint connection, one end portion having an angular slot 29, and the other a stud 30, engagable with said slot by successive endwise and rotary movements of one of the sections. To prevent a reversal of said movements and the separation of the sections, I provide means, preferably embodied in two undercut recesses 31, formed in the sections 12 and 13, and adapted to meet, as indicated by Figure 2, and a filling 32 of Babbitt metal, or other suitable material, solidified in said recesses.

The bearing above described is capable of general application, and is adapted to be engaged with a fixed internally cylindrical socket 33, forming a portion of the frame of a bicycle. The case preferably has a cylindrical external surface, adapted to have a close driving fit in said socket, so that the case may be practically inseparably engaged with a bicycle frame, by forcing it under heavy pressure into the socket.

The ends of the shaft 19 project from opposite ends of the case, and may be connected in any suitable way with the cranks and with the sprocket wheel usually employed with a bicycle crank shaft. A portion of a crank 35, and a portion of a sprocket wheel 36, are shown by dotted lines in Figure 2.

I claim:

1. An antifriction bearing comprising an internally cylindrical case, composed of two independent sections having meeting inner end portions, formed to be interengaged to constitute a continuous case, and having inwardly projecting annular flanges at their outer ends, forming ball race elements; said flanges bounding end openings in the case, a cylindrical shaft extending through the case and through said openings, and provided with peripheral ball-engaging grooves spaced to conform to said flanges; and two series of balls, the diameter of which is such that they bear simultaneously on the groove surfaces, and on the internal surface of the case, and the arrangement being such that the balls are confined by the case in engagement with the grooves, and confine the shaft and case against relative endwise movement, the sectional construction of the case permitting the assemblage of the parts by successive operations, as shown and described.

2. An antifriction bearing substantially as specified by claim 1, the inner end portion of one of said sections being formed to slide into the inner end portion of the other section, said end portions being provided with fastening means preventing their separation.

3. An antifriction bearing substantially as specified by claim 1, the inner end portion of one of said sections being formed to slide into the inner end portion of the other section, said end portions being provided with bayonet joint members, whereby they may be interengaged by an endwise movement, and a partial rotation of either section.

4. An antifriction bearing substantially as specified by claim 1, the inner end portion of one of said sections being formed to slide into the inner end portion of the other section, said end portions being provided with bayonet joint members, whereby they may be interengaged by an endwise movement, and a partial rotation of either section, and with means for preventing an independent rotary movement of either section.

5. An antifriction bearing substantially as specified by claim 1, said case being formed externally to have a close driving fit in a holding socket.

6. An antifriction bearing substantially as specified by claim 1, said case being formed externally to have a close driving fit in a holding socket, and the end portions of said shaft being formed to project from opposite ends of the case, and adapted to engage bicycle cranks.

In testimony whereof I have affixed my signature.

HUGH W. BATCHELLER.